United States Patent
Chen et al.

(10) Patent No.: US 11,909,145 B2
(45) Date of Patent: Feb. 20, 2024

(54) DETECTING CIRCUIT AND DETECTING METHOD OF EXTERNAL DISPLAY DEVICE

(71) Applicant: GETAC TECHNOLOGY CORPORATION, New Taipei (TW)

(72) Inventors: Kuan-Yu Chen, New Taipei (TW); Yao-Wei Yang, New Taipei (TW); Hsueh-Mao Cheng, New Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 18/097,155

(22) Filed: Jan. 13, 2023

(65) Prior Publication Data

US 2023/0237975 A1 Jul. 27, 2023

Related U.S. Application Data

(60) Provisional application No. 63/302,983, filed on Jan. 25, 2022.

(51) Int. Cl.
*G09G 5/00* (2006.01)
*H01R 13/703* (2006.01)
(Continued)

(52) U.S. Cl.
CPC ......... *H01R 13/7036* (2013.01); *G06F 1/263* (2013.01); *G06F 1/324* (2013.01);
(Continued)

(58) Field of Classification Search
CPC ....... G09G 5/006; G06F 3/1423; G06F 1/263; G06F 1/324; G06F 1/3296; H01R 13/7036; H01R 31/065
See application file for complete search history.

(56) References Cited

U.S. PATENT DOCUMENTS

| 8,878,859 B1 | 11/2014 | van Scherrenburg |
| 2007/0018956 A1 | 1/2007 | Kim et al. |

(Continued)

FOREIGN PATENT DOCUMENTS

| TW | 201443772 A | 11/2014 |
| TW | 201835770 A | 10/2018 |
| TW | M593581 U | 4/2020 |

OTHER PUBLICATIONS

European Patent Office, Search Report, Application No. 231521659, dated Jun. 27, 2023, Germany

*Primary Examiner* — Abbas I Abdulselam
(74) *Attorney, Agent, or Firm* — Cooper Legal Group, LLC

(57) ABSTRACT

A detecting circuit of an external display device includes a first connector, a display circuit configured to provide a display signal to the external display device through the first connector, a switch circuit, a power supply circuit configured to provide power needed for operating the display circuit through the switch circuit when the switch circuit is on, and a control circuit configured to turn on the switch circuit upon detecting the external display device so as to connect the power supply circuit to the display circuit. When the switch circuit is on, the control circuit accumulates a duration or a number of times of detection that the external display device is continually not detected, and then turns off the switch circuit to disconnect the power circuit from the display circuit when the duration reaches a time threshold or the number of times of detection reaches a count threshold.

16 Claims, 7 Drawing Sheets

(51) Int. Cl.
*G06F 1/26* (2006.01)
*H01R 31/06* (2006.01)
*G06F 3/14* (2006.01)
*G06F 1/324* (2019.01)
*G06F 1/3296* (2019.01)

(52) U.S. Cl.
CPC .......... *G06F 1/3296* (2013.01); *G06F 3/1423* (2013.01); *G09G 5/006* (2013.01); *H01R 31/065* (2013.01); *G09G 2330/022* (2013.01); *G09G 2370/22* (2013.01)

(56) References Cited

U.S. PATENT DOCUMENTS

| | | | |
|---|---|---|---|
| 2010/0097357 A1* | 4/2010 | Lin | G09G 5/006 345/204 |
| 2014/0253564 A1 | 9/2014 | Redman et al. | |
| 2016/0116969 A1 | 4/2016 | Biswas et al. | |

* cited by examiner

DETECTING CIRCUIT AND DETECTING METHOD OF EXTERNAL DISPLAY DEVICE

The application claims priority to U.S. Provisional Application No. 63/302,983, filed on Jan. 25, 2022, the disclosure of which is hereby incorporated by reference herein in its entirety.

BACKGROUND OF THE INVENTION

Field of the Invention

The present invention relates to a smart start-up technique, and more particularly, to a detecting circuit and a detecting method of an external display device.

Description of the Prior Art

When a common mobile device is not in use and put in a standby mode, idle power consumption is produced in a display circuit that outputs a display signal to an external display device. This idle power consumption affects the operation durability of the mobile device, and at the same time affects the battery life of the mobile device. To prevent the occurrence of idle power consumption, conventionally, a system of a mobile device detects a connection state between an external display device and the mobile device to turn on/off a display circuit; the system turns on the display circuit only upon detecting a connection between the external display device and the mobile device, and the system turns off the display circuit upon detecting a disconnection between the external display device and the mobile device.

However, if a system turns on or off the display circuit by detecting a connection state between an external display device and a mobile device, when the external display device is frequently plugged or unplugged within a short period of time, the system may frequently enable the display circuit, resulting in a busy system and hence undesirably affecting user experience.

SUMMARY OF THE INVENTION

In one embodiment, a detecting circuit of an external display device includes a first connector, a display circuit, a switch circuit, a power supply circuit and a control circuit. The display circuit is coupled to the first connector, and is configured to provide a display signal to the external display device through the first connector. The switch circuit is coupled to the display circuit. The power supply circuit is coupled to the switch circuit, and is configured to provide power needed for operating the display circuit through the switch circuit when the switch circuit is on. The control circuit is coupled to the first connector and the switch circuit, and is configured to detect an external display device through the first connector and to selectively turn on/off the switch circuit according to a detection result of the external display device. The control circuit turns on the switch circuit upon detecting the external display device to connect the power supply circuit to the display circuit. After the switch circuit is turned on, the control circuit further accumulates a duration or a number of times of detection that the external display device is continually not detected, and then turns off the switch circuit to disconnect the power circuit from the display circuit when the duration reaches a time threshold or the number of times of detection reaches a count threshold.

In one embodiment, a detecting method of an external display device includes connecting, upon detecting the external display device while repeatedly detecting the external display device, a power supply path to a display circuit and supplying power to the display circuit through the power supply path; and disconnecting, while the power supply path is connected, the power supply path when an accumulated duration or an accumulated number of times of detection that the external display device is continually not detected reaches a time threshold or a count threshold.

In conclusion, the detecting circuit of an external display device and a detecting method of an external display device according to any of the embodiments are capable of connecting a power supply path to a display circuit only upon detecting the external display device, and disconnecting the power supply path only when the external display device is disconnected for a period of time (that is, when the duration or the number of times of detection that the external display device is not detected reaches a given threshold), thereby preventing the occurrence of idle power consumption as well as the system from frequently enabling the display circuit, further achieving the effect of power saving without undesirably affecting user experience.

The features and advantages of the present invention described in detail in the embodiments below are sufficient for a person skilled in the art to understand and accordingly implement the technical contents of the present invention. Moreover, a person skilled in the art would be able to easily understand the objects and advantages of the present invention on the basis of the disclosure, claims and drawings of the present application.

DETAILED DESCRIPTION OF THE EMBODIMENTS

Figure 1:
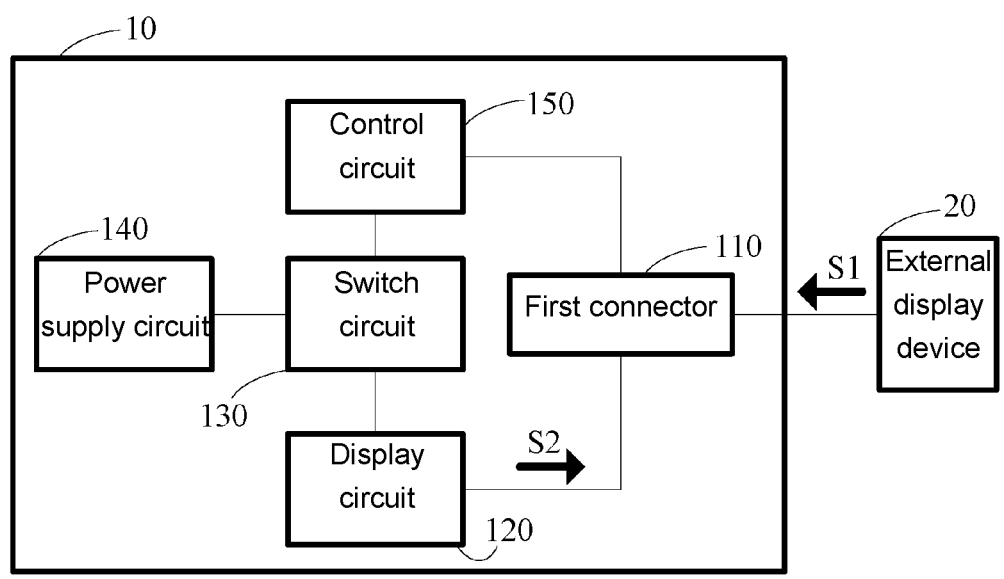
FIG. 1 is a block schematic diagram of a detecting circuit of an external display device according to an embodiment.

FIG. 1 shows a block schematic diagram of a detecting circuit 10 of an external display device 20 according to an embodiment. Referring to FIG. 1, the detecting circuit 10 includes a connector (to be referred to as a first connector 110 below), a display circuit 120, a switch circuit 130, a power supply circuit 140 and a control circuit 150. The first connector 110 is coupled to the display circuit 120, the control circuit 150 and the external display device 20. The switch circuit 130 is connected to the display circuit 120, the power supply circuit 140 and the control circuit 150.

The first connector 110 is configured to be electrically connected to the external display device 20, so as to enable internal circuits of the detecting circuit 10 to transmit signals with the external display device 20 through the first connector 110. In some embodiments, the external display device 20 may be, for example but not limited to, a VGA device, a DisplayPort device, or an HDMI device, and the first connector 110 corresponds to the external display device 20 and may be, for example but not limited to, a VGA interface connector, a DisplayPort interface connector or an HDMI interface connector.

Figure 3:
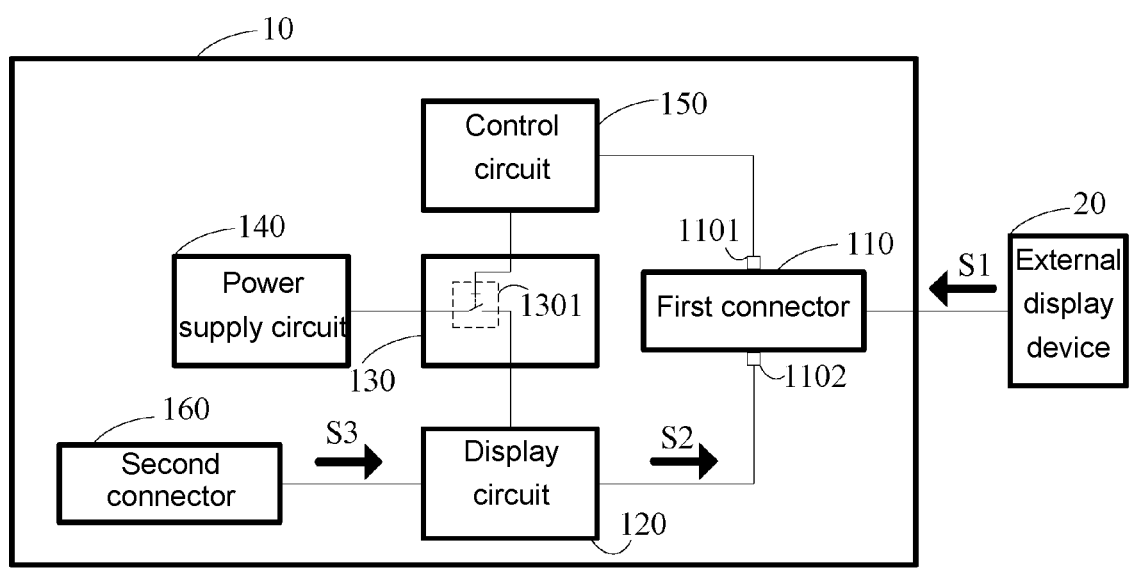
FIG. 3 is a block schematic diagram of a detecting circuit of an external display device according to another embodiment.

The display circuit 120 is configured to provide a display signal S2 to the external display device 20 through the first connector 110. Moreover, the external display device 20 displays an image according to the received display signal S2 upon receiving the display signal S2. In some embodiments, the display signal S2 is display content mapped from a host (not shown) to the display circuit 120. In other words, a signal source of the display signal S2 provided by the display circuit 120 through the first connector 110 to the external display device 20 is a graphics processing unit (GPU) in the host. In some embodiments, the host may be, for example but not limited to, a personal computer (PC), a laptop computer or a tablet computer. In some embodiments, the display circuit 120 may be, for example but not limited to, a display integrated circuit (IC). In one example, the display circuit 120 may be, for example but not limited to, an embedded circuit in the host; in other words, the detecting circuit 10 may be built-in the host. In another example, the display circuit 120 may be, for example but not limited to, a circuit in a converting device connected to the host; in other words, the detecting circuit 10 may be an external device of the host, that is, a converting device connected to the host by another connector (to be referred to as a second connector 160 below, as shown in FIG. 3). The converting device may be, for example but not limited to, an image converter or an adaptor cable.

The switch circuit 130 is controlled by the control circuit 150, and is configured to connect or disconnect a power supply path between the power supply circuit 140 and the display circuit 120. When the switch circuit 130 is turned on, the power supply circuit 140 is connected to the display circuit 120, and at this point, the power supply circuit 140 supplies power needed for operating the display circuit 120. When the switch circuit 130 is turned off, the power supply circuit 140 is disconnected from the display circuit 120, and at this point, the power supply circuit 140 stops supplying power to the display circuit 120.

In other words, the power supply circuit 140 is configured to provide power needed for operating the display circuit 120 through the switch circuit 130 when the switch circuit 130 is on.

The control circuit 150 is configured to detect the external display device 20 through the first connector 110 and to selectively turn on/off the switch circuit 130 according to a detection result of the external display device 20 so as to enable the display circuit 120.

Figure 2:
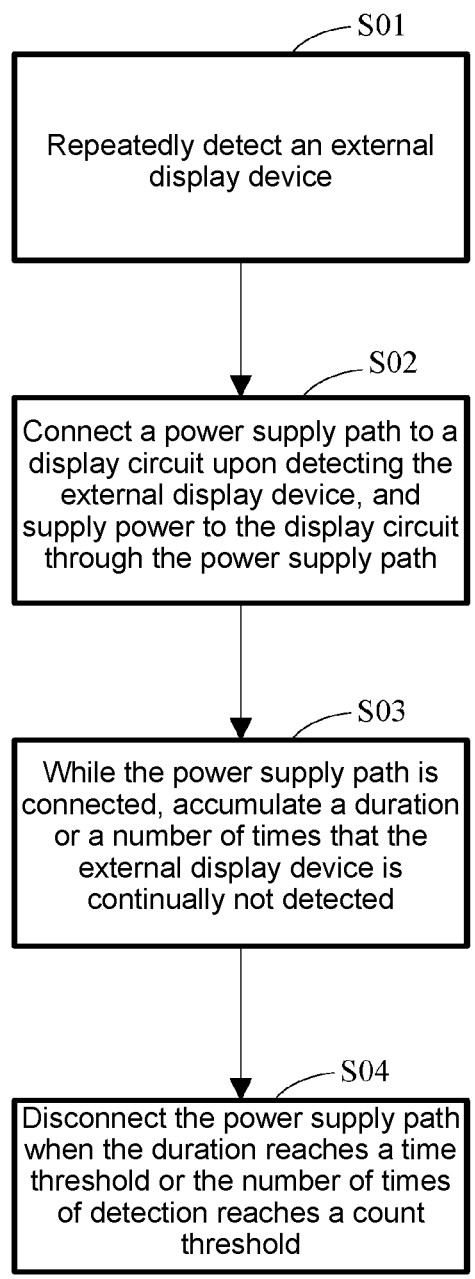
FIG. 2 is a flowchart of a detecting method of an external display device according to an embodiment.

FIG. 2 shows a flowchart of a detecting method of the external display device 20 according to an embodiment. Referring to FIG. 1 and FIG. 2, in some embodiments, the control circuit 150 repeatedly detects through the first connector 110 for a plug signal S1 from the external display device 20 (step S01), so as to determine whether the external display device 20 is detected according to whether the plug signal S1 is received. In other words, the control circuit 150 has detected the external display device 20 when the control circuit 150 receives the plug signal S1, otherwise the external display device 20 is not detected when the plug signal S1 is not received.

When the control circuit 150 detects the external display device 20, the control circuit 150 turns on the switch circuit 130 so as to connect the power supply circuit 140 to the display circuit 120. At this point, the power supply circuit 140 provides the power needed for operating the display circuit 120 so as to enable the display circuit 120 (step S02). After the switch circuit 130 is turned on, the control circuit 150 continues repeatedly detecting the external display device 20 through the first connector 110. When the external display device 20 is not detected, the control circuit 150 accumulates the duration (or the number of times of detection) that the external display device 20 is continually not detected (step S03). When the duration reaches a time threshold (or the number of times of detection reaches a count threshold), the control circuit 150 turns off the switch circuit 130, so that the switch circuit 130 disconnects the power supply circuit 140 from the display circuit 120 (step S04). For example, taking the time threshold for instance, assuming that the time threshold is, for example but not limited to, 10 seconds (s), and the control circuit 150 detects for the external display device 20 for 20 times within 10 s. After the switch circuit 130 is turned on, the control circuit 150 detects for the external display device 20 at a frequency of twice per second, starts timing the duration when the external display device 20 is not detected, and stops and resets the timed duration upon detecting the external display device 20. When the external display device 20 is not detected at all within 10 s, the duration timed by the control circuit 150 reaches 10 s, and only at this point, the control circuit 150 turns off the switch circuit 130. Conversely, as along as the timed duration does not reach 10 s, the control circuit 150 does not turn off the switch circuit 130; that is, the switch circuit 130 is kept on so as to connect the power supply circuit 140 to the display circuit 120. In another example, taking the count threshold for instance, assuming that the time threshold is, for example but not limited to, 20 times, and the control circuit 150 detects the external display device 20 for 20 times within 10 s. After the switch circuit 130 is turned on, the control circuit 150 detects the external display device 20 at a frequency of twice per second, starts accumulating the number of times of detection when the external display device 20 is not detected, and resets the accumulated number of times of detection upon detecting the external display device 20. When the external display device 20 is not detected at all by the detection performed for 20 times, the number of times of detection accumulated by the control circuit 150 reaches 20 times, and only at this point, the control circuit 150 turns off the switch circuit 130. Conversely, as along as the number of times of detection does not reach 20 times, the control circuit 150 does not turn off the switch circuit 130; that is, the switch circuit 130 is kept on so as to connect the power supply circuit 140 to the display circuit 120. In some embodiments, the control circuit 150 may be, for example but not limited to, a microcontroller unit (MCU) or an embedded controller (EC).

FIG. 3 shows a block schematic diagram of the detecting circuit 10 of the external display device 20 according to another embodiment. Referring to FIG. 1 and FIG. 3, in some embodiments, the detecting circuit 10 may further include a second connector 160. The second connector 160 is coupled to the display circuit 120. The detecting circuit 10 can be coupled to a host (not shown) through the second connector 160. When the power supply circuit 140 supplies power, the display circuit 120 receives a display signal S3 from the host through the second connector 160, wherein the display signal S3 is in a first signal specification. The display circuit 120 decodes the display signal S3 to convert the display signal S3 to a display signal S2 in a second signal specification, and the display circuit 120 outputs the display signal S2 in the second signal specification to the external display device 20 through the first connector 110. The first signal specification corresponds to an interface specification of the second connector 160, and the second signal specification corresponds to an interface specification of the first connector 110. For example but not limit to, the second connector 160 is a USB interface connector, and the first connector 110 is an HDMI interface connector; at this point, the first signal specification corresponds to USB signals, and the second signal specification corresponds to HDMI signals. In other words, the detecting circuit 10 is a USB-to-HDMI converting circuit. During power supply, the display circuit 120 receives a USB signal (that is, the display signal S3) from the host through the second connector 160, converts the received USB signal to an HDMI signal (that is, the converted display signal S2), and outputs the HDMI signal to the first connector 110. In some embodiments, the first connector 110 and the second connector 160 may be connectors of different two interface specifications (that is, corresponding to the first signal specification and the second signal specification, respectively), respectively. The interface specifications may be a USB interface, an HDMI interface, DisplayPort interface, a VGA interface or an SD interface.

In some embodiments, the first connector 110 includes a detecting pin 1101 and at least one signal pin 1102. The detecting pin 1101 is coupled to the control circuit 150, and is configured to output the plug signal S1 from the external display device 20 to the control circuit 150. Herein, the control circuit 150, through the detecting pin 1101, repeatedly detects the plug signal S1 from the external display device 20. The signal pin 1102 is coupled to the display circuit 120, and is configured to output the display signal S2 provided by the display circuit 120 to the external display device 20.

In some embodiments, the switch circuit 130 further includes a power switch 1301. The power switch 1301 is coupled between the display circuit 120 and the power supply circuit 140, and is controlled by the control circuit 150. The control circuit 150 generates an on signal to the power switch 1301, so as to turn on the power switch 1301 to turn on the switch circuit 130. When the switch circuit 130 is turned on, the power supply circuit 140 is connected to the display circuit 120 through the power switch 1301, and thus the power supply circuit 140 can supply power needed for operating the display circuit 120 to the display circuit 120 through the power switch 1301. The control circuit 150 generates an off signal to the power switch 1301, so as to turn off the power switch 1301 to turn off the switch circuit 130. When the switch circuit 130 is turned off, the connection coupling between the power supply circuit 140 and the display circuit 120 (that is, the power switch 130 coupled between the two) is disconnected, and so the power supply circuit 140 stops supplying power to the display circuit 120. In some embodiments, the on signal and the off signal may be a high-level signal and a low-level signal, respectively. In some embodiments, the power switch 1301 may be a transistor. The transistor has a first end and a second end respectively connected to the power supply circuit 140 and the display circuit 120, and a control end of the transistor is connected to the control circuit 150.

Figure 4:
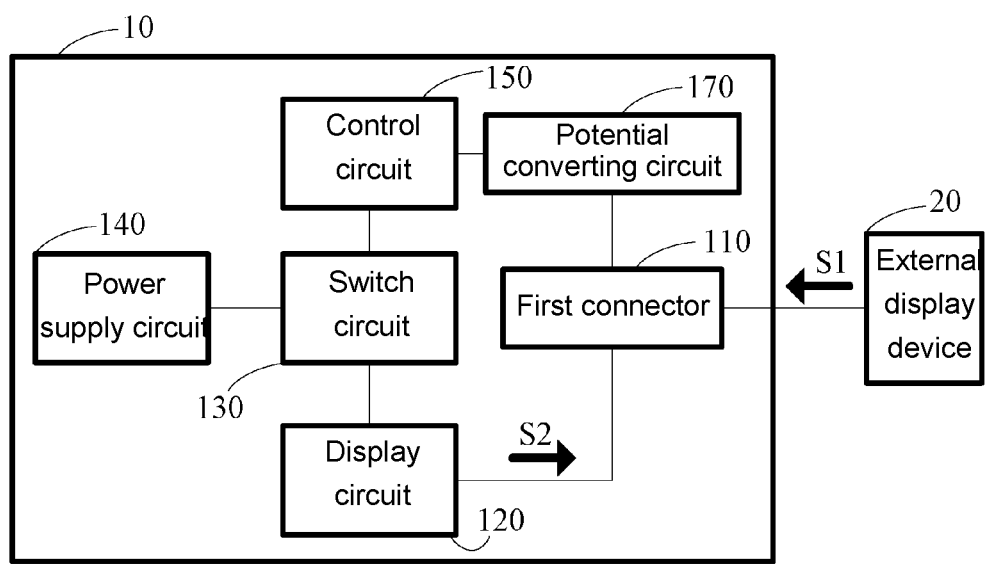
FIG. 4 is a block schematic diagram of a detecting circuit of an external display device according to yet another embodiment.

FIG. 4 shows a block schematic diagram of a detecting circuit 10 of an external display device 20 according to another embodiment. Referring to FIG. 1 and FIG. 4, in some embodiments, the detecting circuit 10 further includes a potential converting circuit 170. The potential converting circuit 170 is coupled between the first connector 110 and the control circuit 150. The potential converting circuit 170 is configured to convert a voltage of the plug signal S1 from the external display device 20 to a voltage suitable for the control circuit 150. For example, the voltage of the plug signal S1 is 5 V, and the voltage suitable for the control circuit 150 is 3.3 V. At this point, the potential converting circuit 170 converts the voltage from 5V of the plug signal S1 to 3.3 V. In some embodiments, the potential converting circuit 170 converts the plug signal S1 from the external display device 20 from a high voltage to a low voltage (for example, converting the voltage of the plug signal S1 from 5 V to 3.3 V) or converts the plug signal S1 from the external display device 20 from a low voltage to a high voltage (for example, converting the voltage of the plug signal S1 from 3.3 V to 5 V). It should be noted that the present invention is not limited to the above examples.

Figure 5:
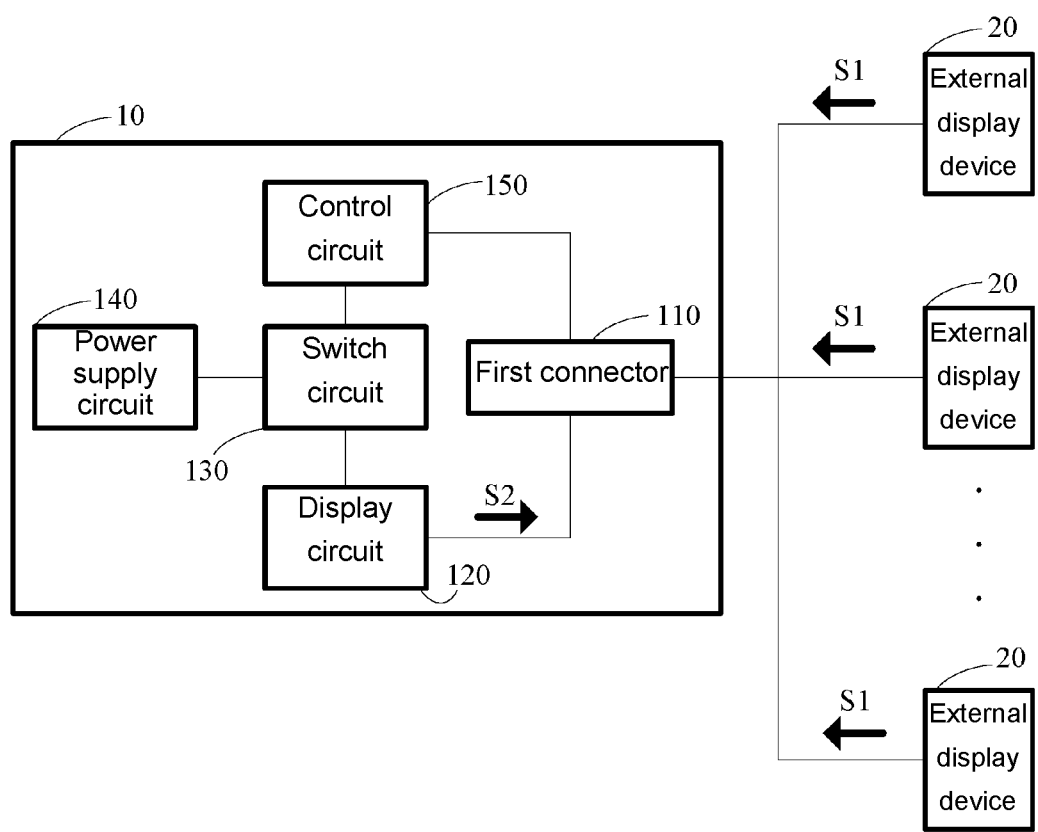
FIG. 5 is a block schematic diagram of a detecting method of an external display device according to yet another embodiment.

FIG. 5 shows a block schematic diagram of a detecting method of an external display device 20 according to yet another embodiment. Refer to FIG. 1 to FIG. 5. In some embodiments, the first connector 110 is electrically connected to a plurality of external display devices 20, so as to enable internal circuits of the detecting circuit 10 to transmit signals with the plurality of external display devices 20 through the first connector 110.

The control circuit 150 repeatedly detects the plug signal S1 from the external display device 20 through the first connector 110, so as to determine whether at least one of the external display devices 20 is detected according to whether the plug signal S1 is received. In other words, the control circuit 150 has detected at least one of the external display devices 20 when the control circuit 150 receives the plug signal S1, otherwise none of the external display devices 20 is detected when the plug signal S1 is not received.

When the control circuit 150 detects at least one of the external display devices 20, the control circuit 150 turns on the switch circuit 130 so as to connect the power supply circuit 140 to the display circuit 120. At this point, the power supply circuit 140 provides the power needed for operating the display circuit 120 so as to enable the display circuit 120. After the switch circuit 130 is turned on, the control circuit 150 continues repeatedly detecting the external display device 20 through the first connector 110. When the external display device 20 is not detected, the control circuit 150 accumulates the duration (or the number of times of detection) that the external display device 20 is continually not detected. When the duration reaches a time threshold (or the number of times of detection reaches a count threshold), the control circuit 150 turns off the switch circuit 130, so that the switch circuit 130 disconnects the power supply circuit 140 from the display circuit 120.

Figure 6:
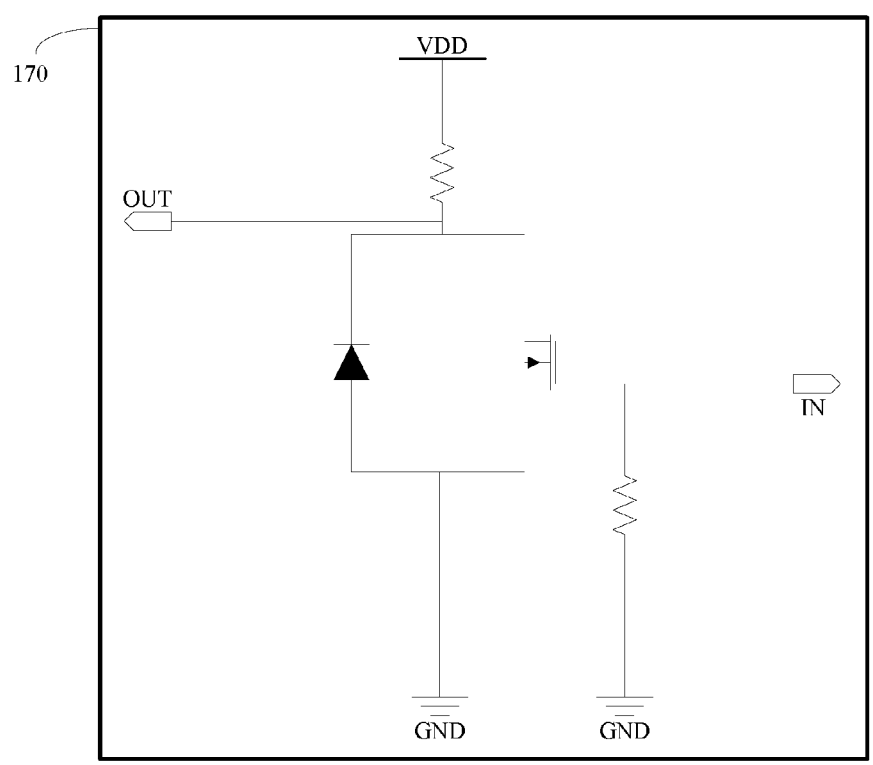
FIG. 6 is a circuit diagram of a potential converting circuit of the detecting circuit of an external display device in FIG. 4.

FIG. 6 shows a circuit diagram of the potential converting circuit 170 of the detecting circuit 10 of an external display device 20 in FIG. 4. In FIG. 6, IN is an input terminal, OUT is an output terminal, VDD is a voltage source and GND is a ground terminal. The input terminal IN is coupled to the first connector 110 (not shown), and the output terminal OUT is coupled to the control circuit 150 (not shown).

Figure 7:
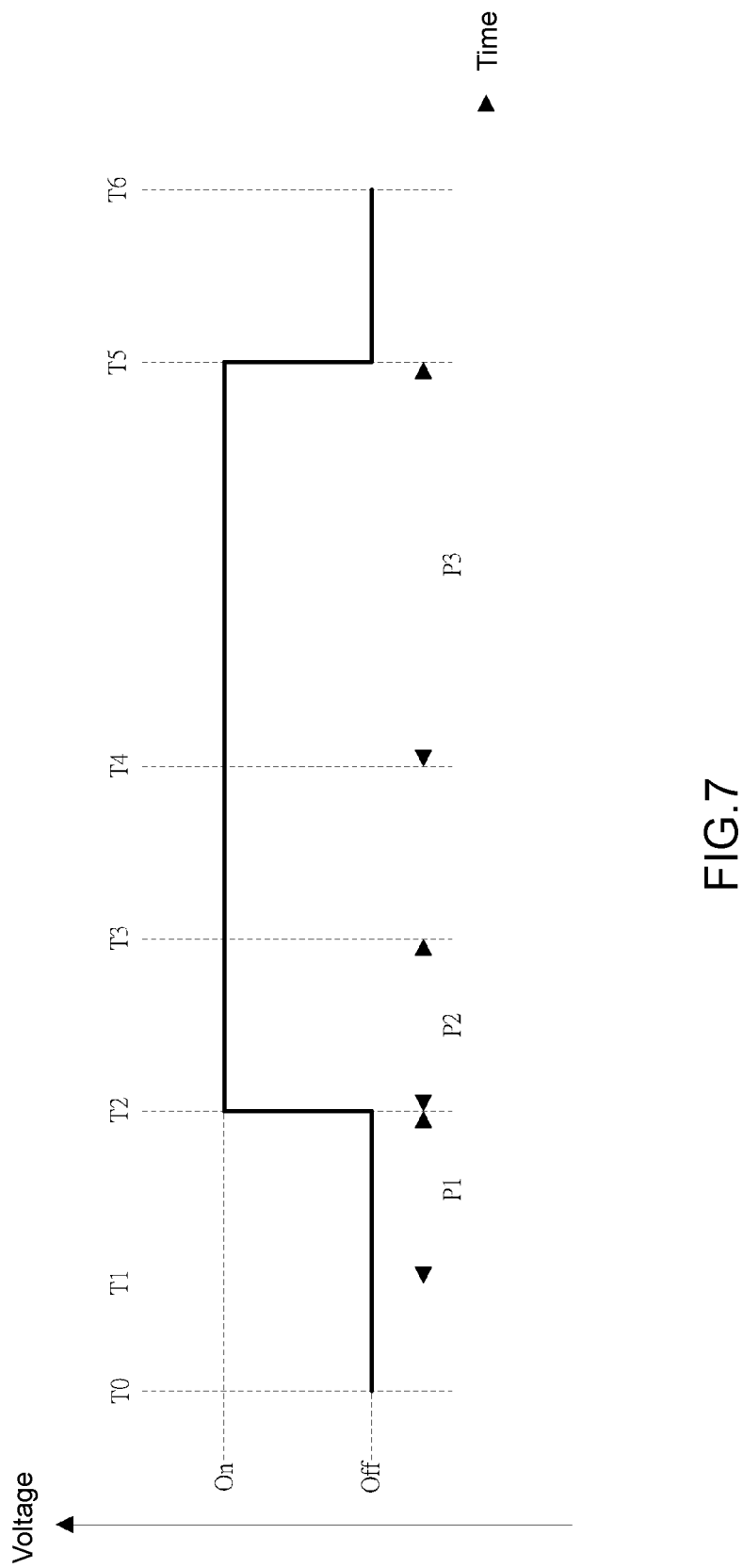
FIG. 7 is a timing diagram of a voltage during an operation period of a display circuit of a detecting circuit of an external display device in FIG. 1.

FIG. 7 shows a timing diagram of a voltage during an operation period of the display circuit 120 of the detecting circuit 10 of the external display device 20 in FIG. 1. In FIG. 7, On is an on voltage of the display circuit 120, and Off is an off voltage of the display circuit 120.

Referring to FIG. 1 and FIG. 7, between a time point T0 and a time point T6, the control circuit 150 repeatedly detects the plug signal S1 from the external display device 20 through the first connector 110. Before the time point T1, because the plug signal S1 is not received, the power supply of the display circuit 120 is kept off for power saving. In other words, before the external display device 20 is plugged, the display circuit 120 does not consume any power.

At a time point T1, the external display device 20 is plugged to the first connector 110. From the time point T1 to a time point T2, the control circuit 150 receives the plug signal S1 from the external display device 20 and outputs an on signal to the switch circuit 130, so that the switch circuit 130 is turned on in response to the on signal at the time point T2. Thus, the power supply circuit 140 starts supplying power to the display circuit 120 through the switch circuit 130. The time needed from receiving the plug signal S1 to turning on the control circuit 150 is a time interval P1 from the time point T1 at which the external display device 20 is plugged to the time point T2 at which power supplied the display device 120 starts.

At the time point T2, the switch circuit 130 is turned on in response to the on signal, and the power supply circuit 140 starts supplying power to the display circuit 120 through the switch circuit 130. At a time point T3, the power supply circuit 140 completes powering the display circuit 120 to enable the display circuit 120, and the display circuit 120 starts providing the display signal S2 to the external display device 20 through the first connector 110 so as to enable the external display device 20 to display an image according to the received display signal S2. The time needed from turning on the switching circuit 130 by the control circuit 150 to enable the display circuit 120 is a time interval P2 between the time point T2 at which the supply circuit 140 starts supplying power to the display circuit 120 through the switch circuit 130 and the time point T3 at which the power supply circuit 140 completes powering the display circuit 120. In some embodiments, the time interval P2 may be, for example but not limited to, 5 seconds.

At a time point T4, the external display device 20 is unplugged from the first connector 110 such that the control circuit 150 starts to not receive the plug signal S1. However, the control circuit 150 does not immediately cut off the power supply to the display circuit 120, but starts to accumulate the duration (or the number of times of detection) that the external display device 20 is continually not detected. At a time point T5, the duration reaches a time threshold (or the number of times of detection reaches a count threshold), and at this point, the control circuit 150 turns off the switch circuit 130 to cut off the power supply to the display circuit 120. The time needed for the duration to reach the time threshold (or the number of times of detection to reach the count threshold) is a time interval P3 from the time point T4 at which the external display device 20 is unplugged to the time point T5 at which the display circuit 120 is turned off. For example, the time threshold is 10 seconds, and the time interval P3 from the time point T4 at which the external display device 20 is unplugged to the time point T5 at which the display circuit 120 is turned off is 10 seconds.

Herein, when the external display device 20 is unplugged, the control circuit 150 does not immediately cut off the power supply to the display device 120, but instead, turns off the switch circuit 130 so as to disconnected the power supply circuit 140 from the display circuit only after confirming for multiple times, that is, when the duration that the external display device 20 is continually not detected reaches the time threshold (or the number of times of detection that external display device 20 is continually not detected reaches the count threshold). Thus, cutting off the power supply to the display circuit 120 in case that the external display device 20 is unplugged unintentionally by a user can be prevented; in other words, re-initialization after unplugging the external display device 20 unintentionally and then quickly plugging it back can be prevented, thus preventing from undesirably affecting user experience. The unplugging unintentionally by a user may be a momentary unplugging of the external display device 20 caused by human collisions or poor wire contacts. For example, if the time threshold is 10 seconds (or the count threshold is 20 times), when a user unintentionally collides into the external display device 20 and causes it to be disconnected from the detecting circuit 10, the user has a time of 10 seconds (or 20 times of detection) to reconnect the external display device 20. If the external display device 20 is reconnected within 10 seconds (or within 20 times of detection), the display circuit 120 at this point is not yet turned off, the control circuit 150 does not need to again turn on the switch circuit 130 to turn on the power supply circuit 140 and the display circuit 120, and the control circuit 150 does not need to again enable the display circuit 120. Thus, a total time of the time interval P1 between the time point T1 at which the external display device 20 is plugged and the time point T2 at which power supplied to the display circuit 120 starts, and the time interval P2 between the time point T2 at which the power supplied to the display circuit 120 starts and the time point T3 at which the external display device 20 displays an image can be saved. In other words, each time the external display device 20 is unintentionally disconnected, the user is not required to again wait for the total time of the time interval P1 between the time point T1 at which the external display device 20 is plugged and the time point T2 at which power supplied to the display circuit 120 starts, and the time interval P2 between the time point T2 at which the power supplied to the display circuit 120 starts and the time point T3 at which the external display device 20 displays an image, thereby enhance user experience. In some embodiments, the total time of the time interval P1 between the time point T1 at which the external display device 20 is plugged and the time point T2 at which power supplied to the display circuit 120 starts, and the time interval P2 between the time point T2 at which the power supplied to the display circuit 120 starts and the time point T3 at which the external display device 20 displays an image may be, for example but not limited to, 5 seconds.

In conclusion, the detecting circuit 10 of the external display device 20 and the detecting method of the external display device 20 according to any of the embodiments are capable of connecting a power supply path to the display circuit 120 only upon detecting the external display device 20, and disconnecting the power supply path only when the external display device 20 is disconnected for a period of time (that is, when the duration or the number of times of detection that the external display device 20 is not detected reaches a given threshold), thereby preventing the occurrence of idle power consumption as well as the system from frequently enabling the display circuit 120, further achieving the effect of power saving without undesirably affecting user experience.

The technical contents of the present invention are disclosed by way of the preferred embodiments above. However, these embodiments are not to be construed as limitation to the present invention. Slight modifications and variations made by a person skilled in the art without departing from the spirit and scope of the present invention are to be encompassed with the scope of the present invention. Therefore, the scope of protection of the present invention is to be accorded with the appended claims.

What is claimed is:

1. A detecting circuit of an external display device, comprising:
   a first connector;
   a display circuit, coupled to the first connector, configured to provide a display signal to the external display device through the first connector;
   a switch circuit, coupled to the display circuit;
   a power supply circuit, coupled to the switch circuit, configured to provide power needed for operating the display circuit through the switch circuit when the switch circuit is on; and
   a control circuit, coupled to the first connector and the switch circuit, configured to detect the external display device through the first connector and to selectively turn on/off the switch circuit according to a detection result of the external display device;
   wherein, the control circuit turns on the switch circuit upon detecting the external display device to connect the power supply circuit to the display circuit; after the switch circuit is turned on, the control circuit further accumulates a duration or a number of times of detection that the external display device is continually not detected, and then turns off the switch circuit to disconnect the power supply circuit from the display circuit when the duration reaches a time threshold or the number of times of detection reaches a count threshold.

2. The detecting circuit of an external display device according to claim 1, further comprising:
   a second connector, coupled to the display circuit; wherein the display circuit receives the display signal from a host through the second connector, converts the display signal from a first signal specification to a second signal specification, and outputs the display signal in the second signal specification to the first connector.

3. The detecting circuit of an external display device according to claim 1, wherein the switch circuit comprises:
   a power switch, coupled between the display circuit and the power supply circuit, and controlled by the control circuit.

4. The detecting circuit of an external display device according to claim 1, wherein the first connector comprises:
   a detection pin, coupled to the control circuit, configured to output a plug signal from the external display device to the control circuit; and
   at least one signal pin, coupled to the display circuit, configured to output the display signal to the external display device.

5. The detecting circuit of an external display device according to claim 1, further comprising:
   a potential converting circuit, coupled between the first connector and the control circuit.

6. The detecting circuit of an external display device according to claim 1, wherein the control circuit is a microcontroller unit (MCU) or an embedded controller (EC).

7. The detecting circuit of an external display device according to claim 1, wherein the display circuit is a display integrated circuit (IC).

8. The detecting circuit of an external display device according to claim 1, wherein the external display device is a video graphics array (VGA) device, a DisplayPort device or a high-definition multimedia interface (HDMI) device.

9. A detecting circuit of an external display device, comprising:
   a first connector;
   a display circuit, coupled to the first connector, configured to provide a display signal to a plurality of external display devices through the first connector;
   a switch circuit, coupled to the display circuit;
   a power supply circuit, coupled to the switch circuit, configured to provide power needed for operating the display circuit through the switch circuit when the switch circuit is on; and
   a control circuit, coupled to the first connector and the switch circuit, configured to detect the plurality of external display devices through the first connector and to selectively turn on/off the switch circuit according to a detection result of the plurality of external display devices;
   wherein, the control circuit turns on the switch circuit upon detecting at least one of the plurality of external display devices to connect the power supply circuit to the display circuit; after the switch circuit is turned on, the control circuit further accumulates a duration or a number of times of detection that the plurality of external display devices are continually not detected, and then turns off the switch circuit to disconnect the power supply circuit from the display circuit when the duration reaches a time threshold or the number of times of detection reaches a count threshold.

10. A detecting method of an external display device, comprising:
    repeatedly detecting the external display device;
    upon detecting the external display device, connecting a power supply path to a display circuit and supplying power to the display circuit through the power supply path;
    while the power supply path is connected, accumulating a duration or a number of times of detection that the external display device is continually not detected; and
    disconnecting the power supply path when the duration reaches a time threshold and the number of times of detection reaches a count threshold.

11. The detecting method of an external display device according to claim 10, further comprising:
    after the power is supplied to the display circuit through the power supply path, outputting a display signal by the display circuit, and providing the display signal to the external display device through a first connector.

12. The detecting method of an external display device according to claim 11, further comprising:
    receiving the display signal through a second connector.

13. The detecting method of an external display device according to claim 12, further comprising:
    converting a signal specification of the display signal by the display circuit.

14. The detecting method of an external display device according to claim 10, wherein the step of connecting the power supply path to the display circuit comprises:
    turning on a power switch between the display circuit and a power supply circuit.

15. The detecting method of an external display device according to claim 14, wherein the step of disconnecting the power supply path comprises:
    turning off the power switch.

16. The detecting method of an external display device according to claim 10, wherein the step of repeatedly detecting the external display device comprises:

repeatedly detecting a detection pin of a first connector to confirm whether the detection pin receives a plug signal, wherein the external display device is detected when the plug signal is received, otherwise the external display device is not detected when the plug signal is not received.

\* \* \* \* \*